United States Patent
Hartland et al.

(10) Patent No.: US 11,634,198 B2
(45) Date of Patent: Apr. 25, 2023

(54) CONTROL OF REMOTELY OPERATED VEHICLE'S DYNAMIC POSITIONING SYSTEM BY EXTERNAL NAVIGATION SYSTEM

(71) Applicant: Seabed Geosolutions B.V., Leidschendam (NL)

(72) Inventors: Martin John Hartland, Katy, TX (US); Michael Meech, Houston, TX (US)

(73) Assignee: Seabed Geosolutions B.V., Leidschendam (NL)

( * ) Notice: Subject to any disclaimer, the term of this patent is extended or adjusted under 35 U.S.C. 154(b) by 616 days.

(21) Appl. No.: 16/487,746

(22) PCT Filed: Apr. 19, 2018

(86) PCT No.: PCT/US2018/028340
§ 371 (c)(1),
(2) Date: Aug. 21, 2019

(87) PCT Pub. No.: WO2018/200305
PCT Pub. Date: Nov. 1, 2018

(65) Prior Publication Data
US 2020/0231261 A1 Jul. 23, 2020

Related U.S. Application Data

(60) Provisional application No. 62/491,147, filed on Apr. 27, 2017.

(51) Int. Cl.
*G01V 1/38* (2006.01)
*B63G 8/00* (2006.01)
*G05D 1/04* (2006.01)

(52) U.S. Cl.
CPC ........... *B63G 8/001* (2013.01); *G01V 1/3852* (2013.01); *G05D 1/048* (2013.01); *B63G 2008/007* (2013.01)

(58) Field of Classification Search
CPC .............. B63G 8/001; B63G 2008/007; G01V 1/3852; G05D 1/048
See application file for complete search history.

(56) References Cited

U.S. PATENT DOCUMENTS

| 6,975,560 B2 | 12/2005 | Berg et al. |
| 7,210,556 B2 | 5/2007 | Bath et al. |

(Continued)

OTHER PUBLICATIONS

F. Dukan, M. Ludvigsen and A. J. Sørensen, "Dynamic positioning system for a small size ROV with experimental results," OCEANS 2011 IEEE—Spain, 2011, pp. 1-10, doi: 10.1109/Oceans-Spain.2011.6003399. (Year: 2011).*

(Continued)

*Primary Examiner* — Ian J Lobo
(74) *Attorney, Agent, or Firm* — Park, Vaughan, Fleming & Dowler LLP; Shane Nelson

(57) ABSTRACT

Embodiments, including systems and methods, for remotely controlling underwater vehicles (such as ROVs) and deploying ocean bottom seismic nodes from the underwater vehicles. A direct data connection may be created between an Integrated Navigation System (located on a surface vessel) and a ROV controller/Dynamic Positioning (DP) system (which may be located on the surface vessel and/or the ROV). The INS may be configured to output the ROV target position and ROV position (such as standard 2 or 3 dimensional coordinates) to the DP system. The DP system may be configured to calculate the necessary ROV movements based on directly received data from the INS. Based on a selected ROV target destination or desired ROV action (which may be done automatically or by an operator), the (Continued)

ROV may be automatically positioned and/or controlled based on commands from the DP system based on commands and/or data from the INS.

10 Claims, 4 Drawing Sheets

(56) References Cited

U.S. PATENT DOCUMENTS

| | | | |
|---|---|---|---|
| 7,324,406 | B2 | 1/2008 | Berg |
| 7,632,043 | B2 | 12/2009 | Thompson et al. |
| 8,075,226 | B2 | 12/2011 | Thompson et al. |
| 8,310,899 | B2 | 11/2012 | Woodard, Jr. et al. |
| 8,611,181 | B2 | 12/2013 | Woodward, Jr. et al. |
| 9,090,319 | B2 | 7/2015 | Brizard et al. |
| 9,415,848 | B2 | 8/2016 | Jewell |
| 9,873,496 | B2 | 1/2018 | Rokkan et al. |
| 2006/0159524 | A1 | 7/2006 | Thompson et al. |
| 2008/0048881 | A1 | 2/2008 | Safinya et al. |
| 2011/0217123 | A1 | 9/2011 | Jewell et al. |
| 2013/0083624 | A1 | 4/2013 | Brizard et al. |
| 2013/0259577 | A1 | 10/2013 | Hansen et al. |
| 2015/0246711 | A1 | 9/2015 | Lee |
| 2015/0284060 | A1 | 10/2015 | Jewell et al. |
| 2015/0316675 | A1 | 11/2015 | Brizard et al. |
| 2016/0041284 | A1 | 2/2016 | Rokkan et al. |
| 2016/0121983 | A1 | 5/2016 | Rokkan et al. |
| 2016/0153585 | A1 | 6/2016 | Hansen et al. |

OTHER PUBLICATIONS

Omerdic E, Toal D, Dooly G (2017) Precision Control and Dynamic Positioning of ROVS in Intervention Operations. J Robotics Autom 1(1):24-41. (Year: 2017).*
Maslin, E., "Starting from the (Ocean) Bottom", Offshore Engineer, Mar. 1, 2017 (Year: 2017).*
IMCA; "Code of Practice for The Safe & Efficient Operation of Remotely Operated Vehicles", published Mar. 20, 2014, IMCA R004 Rev 3.
PCT/US2018/028340 International Search Report and the Written Opinion of the International Search Authority, European Patent Office, Aug. 28, 2018.
U.S. Appl. No. 15/836,734, filed Dec. 8, 2017, Inventor Brendan James Reid.
U.S. Appl. No. 15/903,607, filed Feb. 23, 2018, Inventor Martin John Hartland.

* cited by examiner

CONTROL OF REMOTELY OPERATED VEHICLE'S DYNAMIC POSITIONING SYSTEM BY EXTERNAL NAVIGATION SYSTEM

PRIORITY

This application claims priority to U.S. provisional patent application No. 62/491,147, filed on Apr. 27, 2017, the entire content of which is incorporated herein by reference.

BACKGROUND OF THE INVENTION

Field of the Invention

This invention relates to the management of a remotely operated vehicle, and more particularly to the control of a remotely operated vehicle by an external navigation system.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name MANTA®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as one or more seismic sensors (e.g., geophone and hydrophone sensors), a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. See, e.g., U.S. Pat. No. 9,523,780 (citing patents and publications), incorporated herein by reference. Still further, the autonomous seismic nodes may be integrated with an AUV such that the AUV, at some point subsea, may either travel to or from the seabed at a predetermined position. See, e.g., U.S. Pat. No. 9,090,319, incorporated herein by reference. In general, the basic structure and operation of an autonomous seismic node and a seismic AUV is well known to those of ordinary skill.

A general seismic deployment and survey operation generally require one or more surface vessels that deploy and/or retrieve autonomous seismic nodes from the ocean bottom. See, e.g., U.S. Pat. No. 9,090,319, incorporated herein by reference. Generally, a deployment vessel stores a plurality of autonomous seismic nodes, and one method of deployment utilizes a ROV as well as a separate basket to hold some of the seismic nodes, each which is lowered to a subsea position and connected to a surface vessel by a deployment line, such as an umbilical, tether, or wire. As is known in the art, one or even two ROVs may be used to deploy nodes to the ocean bottom. See, e.g., U.S. Pat. Nos. 6,975,560; 7,210,556; and 8,611,181, incorporated herein by reference. One conventional method is to deploy a ROV in a body of water while also deploying a separate underwater node transfer device, such as a cage, basket, and/or skid that is configured to hold a plurality of autonomous seismic nodes and be lowered and raised from a surface vessel. At a certain subsea position, the ROV docks or mates with the node transfer device and transfers one or more nodes from the node transfer device to the ROV. The ROV then places the retrieved nodes at one or more positions on the seabed. Prior art patents and publications illustrating this method include at least the following: U.S. Pat. Nos. 6,975,560; 7,210,556; 7,324,406; 7,632,043; 8,310,899; 8,611,181; 9,415,848; 9,873,496, and U.S. Patent Application Publication Nos. 2006/0159524 and 2015/0284060, each of which is incorporated herein by reference.

Dynamic Positioning (DP) systems are not new and have been used in ROVs. For example, conventional ROVs may be equipped with a DP system that allows the ROV to follow a certain track or maintain a position and/or orientation relative to an object that may be moving or be stationary, such as remaining stationary at a subsea position, holding a preset course during subsea travel, maintaining a set speed, etc. Likewise, using an Integrated Navigation System (INS) for a surface vessel is not new. However, current surface vessel INS systems are not configured to actively couple with a ROV control system, thereby limiting the ability to automatically control the ROV by the DP system and/or the INS.

For example, in OBN surveys, the desired coordinates of node locations are generally predetermined at the planning stage, and may be generically called "preplots." The surface vessel INS has a list of these preplots and also calculates the position of the ROV in realtime (based on various ROV measurements, etc.). Because there is no direct link between the INS and the ROV DP system in conventional systems, the operator of the ROV has to hand steer the ROV to the target location, such as the intended seabed destination where the seismic node will be laid or other subsea position that the ROV needs to travel towards. The surface vessel INS provides the ROV operator/pilot graphical and numerical cues as to how far away the ROV is in terms of range and bearing from the target location. In other words, a conventional INS may provide steering guidance for the ROV to the ROV operator, but it is unable to automatically control the ROV based on (among other issues) a lack of interface between the INS and the ROV control system. While this method works for some operations, the need for increased ROV speed and efficiency for subsea operations requires a greater knowledge and automatic management of the overall ROV system, which cannot be performed by current technologies, particularly when two or more ROVs are working simultaneously. In particular, the use of more than two ROVs for the deployment of seismic nodes is not possible and/or practical based on current technologies, as each additional ROV exponentially increases the complexity of the operation. For example, with conventional technologies, for each ROV used approximately 6-10 operators may be needed on the vessel to manage the operations of the ROV. A large number of ROVs (such as 4 or 6 ROVs) currently requires a large number of operators on the vessel, much more than a standard surface vessel would allow. Further, the Code of Practice for the Safe & Efficient Operation of Remotely Operated Vehicles, published by the International Marine Contractors Association (IMCA) and incorporated herein by reference, requires in Section 9.2.3 a minimum crewing level of three per 12-hour shift for each working ROV. While a three-man crew potentially allows for the use of two pilots and one technical per vehicle, a large number of ROVs working simultaneously requires a large number of operators, which is both impractical and expensive.

With today's need for increased speed and efficiency for subsea operations, handling and operating a large number of ROVs at the same time using conventional technologies is simply not feasible. A need exists for an improved method and system for deploying seismic nodes on the seabed, particularly with a large number of ROVs. A need exists for an improved method and system for deploying and operating remotely operated vehicles during subsea operations, particularly with the use of multiple ROV operations for the deployment of seismic nodes on the seabed.

SUMMARY OF THE INVENTION

Embodiments, including systems and methods, for remotely controlling underwater vehicles (such as ROVs) and deploying ocean bottom seismic nodes from the underwater vehicles. A direct data connection is created between an Integrated Navigation System (located on a surface vessel) and a ROV controller/Dynamic Positioning (DP) system (which may be located on the surface vessel and/or the ROV itself). The INS may be configured to output the ROV target position and ROV position (such as standard 2 or 3 dimensional coordinates) to the DP system. The DP system may be configured to calculate the necessary ROV movements based on directly received data from the INS. Based on a selected ROV target destination or desired ROV action (which may be done automatically or by an operator), the ROV may be automatically positioned and/or controlled based on commands from the DP system based on commands and/or data from the INS. In one embodiment, two, three, four or more ROVs are deployed from the surface vessel and coupled to the INS and DP systems described herein.

The present disclosure provides a method for the remote control of a remotely operated vehicle, with the method comprising deploying one or more remotely operated vehicles (ROVs) from a surface vessel and automatically positioning the one or more ROVs from a first subsea position to a second subsea position based on data provided by an Integrated Navigation System (INS) to a ROV Dynamic Positioning (DP) system. In one embodiment, each of the ROVs may be coupled to a DP system. In one embodiment, the INS and ROV DP system are both located on the surface vessel, while in other embodiments the INS and ROV DP system are located on each of the one or more ROVs. In one embodiment, the automatically positioning step does not require an ROV operator to physically steer the ROV.

The INS may be directly coupled to the ROV DP system, such as by a direct data link. In one embodiment, the data connection/link is created using commercially available Ethernet hardware and a standard TCP/IP protocol to send messages of a defined format of the necessary coordinates in 2 dimensions (e.g., x, y) or 3 dimensions (e.g., x, y, z) such that the INS can provide the ROV DP system the coordinates of the next target position as selected by the INS operator. In some embodiments, the transmitted data/messages may include frequent updates (e.g., one update per second) on the ROV's calculated position to the ROV DP system. Such messages from the INS provide the ROV enough information to allow its DP system to make the necessary commands to the ROV propulsion system to proceed to the target position according to parameters defined by the ROV operator or in the ROV's control software.

The method may or may not include deploying and/or retrieving seismic nodes from the seabed. For example, the method may comprise automatically deploying a plurality of seismic nodes on the seabed by the one or more ROVs based on commands provided by the DP system. The method may further comprise deploying a subsea basket configured to hold the plurality of seismic nodes from the surface vessel and transferring a portion of the plurality of seismic nodes from the subsea basket to the one or more ROVs at one or more subsea positions. The method may further comprise automatically docking the one or more ROVs to the subsea basket based on data provided by the navigation system.

The method may include outputting an ROV position or ROV target position from the INS to the DP system at a regular time interval. The method may include determining a position of the ROV by the INS and outputting that ROV position to the DP system. The method may include determining and/or calculating one or more ROV actions to be taken by the DP system based on data received by the INS. In some embodiments, the calculating step is based on the ROV target position, the ROV position, and one or predefined ROV operating parameters. The method may include automatically positioning each of the one or more ROVs at a predefined position by the DP system based on an emergency situation. In one embodiment, a set of parameters and/or commands is pre-programmed (such as moving the baskets, ROVs, and/or TMS units to particular coordinates or to engage in certain tasks) and is automatically activated based on occurrence of an emergency situation.

The present disclosure provides a method for the deployment of seismic nodes on the ocean bottom, comprising deploying one or more remotely operated vehicles (ROVs), determining a position of the ROV by an Integrated Navigation System (INS) and outputting that ROV position to an ROV DP system, determining and/or calculating one or more ROV actions by the DP system based on data received by the INS, automatically positioning the one or more ROVs towards a target subsea position based on commands provided by the DP system, and automatically deploying each of the plurality of seismic nodes on the seabed based on commands provided by the DP system. In one embodiment, each of the ROVs is coupled to a dynamic positioning (DP) system and each of the ROVs is configured to hold a plurality of seismic nodes. In one embodiment, the ROVs may automatically dock to and/or transfer seismic nodes between a subsea basket. The method may include automatically retrieving the seismic nodes from the seabed (based on commands from the DP system) after a seismic survey has been completed.

The present disclosure also provides a system for the remote control of a remotely operated vehicle. The system may comprise one or more remotely operated vehicles (ROVs) connected to a surface vessel, a dynamic positioning (DP) system coupled to the one or more ROVs, and an integrated navigation system (INS) located on the surface vessel and coupled to the dynamic positioning system, wherein the INS is configured to output a ROV target position and the ROV position to the DP system. The DP system and the INS may be directly coupled via a data link. The DP system is configured to automatically position the ROV from a first subsea position to a second subsea position based on data provided by the INS. The DP system is configured to calculate one or more actions to be performed by the ROV based on data provided by the INS. The system may further comprise a subsea basket configured to hold a plurality of seismic nodes and dock with the one or more remotely operated vehicles. The system may further comprise a ROV positional system configured to measure a subsea position of the ROV and located on either the surface vessel or the ROV.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
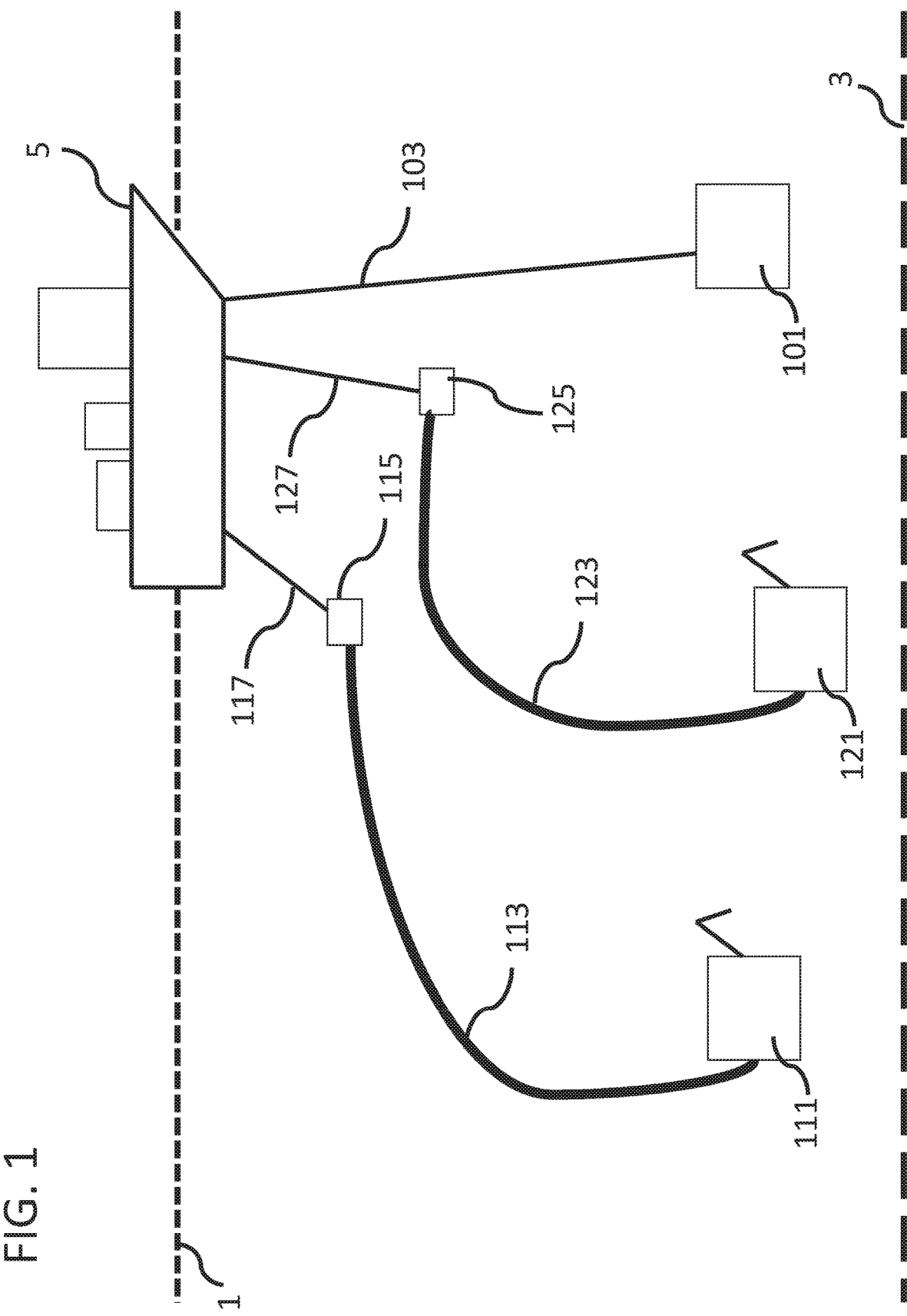
FIG. 1 illustrates one embodiment of a subsea seismic deployment operation using tethered ROVs.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

System and Operation

As mentioned above, prior art ROV systems do not interface and/or couple a surface vessel Integrated Navigation System (INS) with the ROV control system/dynamic positioning (DP) system to control a significant part of the mission operations, thereby limiting the ability to automatically control the ROV during subsea operations. Further, prior art systems are inefficient and not practical during high speed operations involving two or more ROVs. Still further, prior art DP systems (without the full range of mission planning) are unable to avoid conflicts with other ROVs and seabed hazards that are identified within the surface vessel INS. For example, avoiding the tangling of vehicles with baskets and other ROVs/subsea devices is an important part of the integration of the INS and DP system that is not possible based on existing technologies. Further, due to the dynamic nature of OBN operations with multiple ROVs working together, it quickly becomes too complex a situation to manage efficiently using human operators alone. For example, prior art ROV operations involve an operator using visual monitoring and piloting of the vehicle based on forward looking sonar to avoid other vehicles during travel back from a basket or to/from a distal or remote location. However, the disclosed INS can compute the most efficient path back to a basket from a distal or remote location with multiple other ROVs operating (such as in way of a straight-line path), in addition to performing such operations while the surface vessel is moving at up to 2 knots, and automatically work with the disclosed ROV DP system for managing the coordination and travel paths for each of the ROVs.

In one embodiment, the present disclosure creates a data connection between the surface vessel INS and the ROV controller/dynamic positioning (DP) system. In one embodiment, the data connection/link is created using commercially available Ethernet hardware and a standard TCP/IP protocol to send messages of a defined format of the necessary coordinates in 2 dimensions (e.g., x, y) or 3 dimensions (e.g., x, y, z) such that the INS can provide the ROV DP system the coordinates of the next target position as selected by the INS operator. In some embodiments, the transmitted data/messages may include frequent updates (e.g., one update per second) on the ROV's calculated position to the ROV DP system. Such messages from the INS provide the ROV enough information to allow its DP system to make the necessary commands to the ROV propulsion system to proceed to the target position according to parameters defined by the ROV operator or in the ROV's control software.

In one embodiment, the surface vessel comprises an Integrated Navigation System (INS) and a separate Dynamic Positioning (DP) system is located on each of the deployed ROVs. In another embodiment, the surface vessel comprises an Integrated Navigation System (INS) and a separate Dynamic Positioning (DP) system for each of the ROVs deployed by the surface vessel. In other embodiments, the DP system is at least partially located on each ROV. Each of the INS and DP systems is described in more detail herein.

In one embodiment, the INS operator makes the selection of the target location. The target location may be either a preplot location or any fixed or dynamic waypoint defined by the INS, such as the position of another ROV, a seabed destination, the ROV's Tether Management System (TMS), a winch hook, or a "basket" containing pallets of seafloor equipment lowered down from the vessel. With the target defined and being reported along with the current position of the ROV, the ROV pilot can choose to engage this data stream as the reference for the ROV DP system. This allows the ROV pilot to maintain more of a passive role, overseeing that the ROV is navigating safely and within limits, instead of requiring the pilot to manually steer the whole journey as is required in prior art systems/operations. Thus, the ROV can be maneuvered automatically, which allows the ROV to move faster and more accurately and decreases the amount of manpower needed to operate the ROV. In one embodiment, the disclosed system is commercially favorable in order to reduce pilot fatigue, increase accuracy of the ROV operations, and/or allow the pilot to concentrate on other vehicles or tasks. Thus, the present disclosure provides a more efficient and cost-effective way to move the ROV from a first position to a second position than hand steering alone. In some embodiments, some or all of the ROV tasks (such as docking with a subsea device, loading/unloading subsea payloads, planting and picking up autonomous seismic nodes from the seabed, etc.) can be automated for increased efficiencies. In one embodiment, an augmented reality system may be utilized that so that ROV operators can visualize in the distance what hazards and/or seabed features may be in the path of the vehicle, and such features may also be included in the INS computed ROV path/track to avoid the seabed feature and/or subsea hazard.

In one embodiment, mission-planning software may be integrated with the real-time catenary modeling software for increased automation and/or control of the ROVs. For example, such a combination facilitates the return of the ROV to the basket and TMS by avoiding an ROV running into the tether of another ROV and predicting the most efficient/optimal heading, speed, and depth for the ROV. The optimal course may be maintained by the ROV's Dynamic Positioning system. Automated tether control is achieved by integrating the catenary modeling system (such as feedback from the catenary modeling system) to the corresponding TMS system (such as a TMS winch). Automated tether control helps maintain an optimal tether catenary, which results in improved ROV speed and less loading/movement by the ROV thrusters. In contrast, conventional tether control is a manual operation with the ROV pilot observing winch load and tether shape by a camera, which is inefficient and not practically possible for a large number of operating ROVs.

As mentioned above, Section 9.2.3 of the IMCA Code of Practice for the Safe & Efficient Operation of Remotely Operated Vehicles, requires a minimum crewing level of three per 12-hour shift for each working ROV. In one embodiment, the disclosed integrated DP control system reduces the workload on the pilots/operators and allows the use of three pilots covering two ROVs, instead of the previous standard of two pilots and one technical personnel per ROV. In this embodiment, there may always be one pilot in the operating chair while one pilot may standby as a back up. This allows a crew of three pilots and two technicians for one 12-hour shift for two ROVs working simultaneously. Thus, for two shifts (such as for ROV operations above 12 hours long, such as 14 hours or up to 24 hours), two ROVs may be controlled by at most a 10-man crew instead of a standard 12-man crew without compromising safety and reliability. Thus, the disclosed integrated ROV DP control system not only increases automation and efficiency of the ROV operations, but also decreases the amount of manpower needed to safely operate the ROVs.

FIG. 1 shows one example of a subsea deployment operation for a plurality of seismic nodes. In one embodiment, surface vessel 5 is located on water surface 1 and is configured to deploy first ROV 111, second ROV 121, and subsea basket 101 (which holds a plurality of seismic nodes 2) on or near seabed 3. For simplicity purposes, FIG. 1 only shows two ROVs deployed from the vessel, although many more ROVs are possible based on this disclosure.

In one embodiment, the present disclosure allows a surface vessel to operate a higher number of working ROVs (WROVs) from the traditional number of one or two per vessel simultaneously without risk of wire/line clashing and the tangling of subsea elements. In one embodiment, the surface vessel operating speed may travel approximately up to 2 knots as a function of water depth while simultaneously deploying six ROVs, with a node receiver line spacing of approximately 200 meters. For example, at 1500 meters of water depth the surface vessel may travel at approximately 2 knots, but may travel faster at shallower depths and slower at deeper depths of up to 3000 meters (or more). The present disclosure allows the crew size to be safely reduced from current IMCA (International Marine Contractors Association) guidance of approximately 6 men per WROV to 4 or less men per WROV. This significantly decreases the cost to operate the ROVs and increases the efficiency of each ROV and the overall node deployment operation.

As is known in the art, first ROV 111 is coupled to first TMS 115 via tether 113 and second ROV 121 is coupled to second TMS 125 via tether 123, with first TMS 115 being coupled to surface vessel 5 via umbilical cable 117 and second TMS 125 being coupled to surface vessel 5 via umbilical cable 127. In some embodiments, only one ROV may be used. Additional ROVs are similarly coupled to the surface vessel, each with a corresponding tether, TMS, and umbilical cable/line. In general, for the purposes of this disclosure, some or all of the portions of an ROV's tether and/or umbilical cable may be generally considered as the ROV's deployment line. As is known in the art, the tether management system (TMS) is coupled to the ROV during lowering and/or raising of the ROV through the splash zone from the surface vessel. The TMS has a tether winch that may length and/or shorten the tether as appropriate. The umbilical cable provides power and data signals between the surface vessel and the TMS. The TMS relays data signals and/or power for the ROV through the tether line. In some embodiments, untethered ROVs or UUVs may be used.

In one embodiment, each ROV may be the FUGRO FCV3000 or similar ROV, but other ROVs can be used as well. In general, the structure and operation of marine ROVs are well known to those of ordinary skill. For example, U.S. Publication No. 2015/0316675, incorporated herein by reference, describes a ROV configured to deploy and retrieve autonomous seismic nodes to the seabed with a separate AUV configured to monitor and exchange data with the seismic nodes. Likewise, U.S. Pat. No. 8,075,226, incorporated herein by reference, describes a ROV configured to physically deploy autonomous seismic nodes from a carrier located on the ROV as well as a basket lowered by a surface vessel and to mechanically connect the ROV to the lowered basket to transfer nodes from the basket to the ROV carrier.

In other embodiments, an autonomous underwater vehicle (AUV) or other unmanned underwater vehicle (UUV) may be used instead of an ROV Likewise, the structure and operation of an AUV is well known to those of ordinary skill. For example, Applicant's U.S. Pat. No. 9,090,319, incorporated herein by reference, discloses one type of autonomous underwater vehicle for marine seismic surveys. Applicant's U.S. Pat. No. 9,873,496, incorporated herein by reference, discusses the general components and configurations of ROVs and seismic AUVs, incorporated herein by reference. Of course, one of skill in the art realizes that the AUV or UUV (or ROV) for deploying seismic nodes to the seabed need not have any seismic sensors itself. While various ROVs, UUVs, or AUVs may be used with the embodiments presented in this disclosure, the invention is not limited to any particular underwater vehicle or configuration thereof to deploy the autonomous seismic nodes on the seabed.

Basket 101 may be lowered from surface vessel 5 via cable 103 with a plurality of autonomous seismic nodes 2 (or other seismic payload devices) stored on the basket for transfer with the ROV(s), such as disclosed in U.S. Pat. Nos. 6,975,560 and 9,873,496, each incorporated herein by reference. In some embodiments, two or more subsea baskets may be deployed from the vessel. Subsea basket 101 may be located near the surface, at a subsea position between the seabed and the surface, near the seabed, or on the seabed. In one embodiment, the ROV and/or subsea basket may be moving in the body of water with a first speed based on movement of the ROV, movement of the vessel, or current movement. Each ROV may be used to transfer seismic nodes from basket 101 and deploy those seismic nodes to seabed 3 at predetermined positions. In other embodiments, no basket is used and one or more of the ROVs transfers seismic nodes to the seabed directly from the surface vessel or another subsea position.

In one embodiment as shown in FIG. 1, the ROV may have a skid or other node storage system for storing a plurality of autonomous seismic nodes on the ROV as is known in the art. Node storage system may be located on an underside of the ROV or may be located on a front, back, or side portion of the ROV. In the embodiment shown in FIG. 1, each of the ROVs has a plurality of nodes stored on a skid coupled to the ROV. In some embodiments, the nodes may be stored and/or handled by a plurality of grabbers, grippers, manipulators, or other single node handling devices, as described herein. For example, each ROV may hold a plurality of autonomous seismic nodes by any number of mechanisms, such as a robotic arm manipulator, a cage, basket, conveyor, or skid, as described in U.S. Pat. Nos. 6,975,560, 7,210,556, and 8,611,181, and U.S. Patent Publication No. 2006/0159524, each incorporated herein by reference. Likewise, the ROVs may dock with and/or couple to the basket by a wide variety of mechanisms, such as by one or more docking probes as described in U.S. Pat. Nos. 6,975,560 and 9,415,848 and U.S. patent application Ser. Nos. 15/836,734 and 15/903,607, each incorporated herein by reference. Thus, in one embodiment, the ROV may have a docking system used to dock and/or mate with subsea basket 101, which may or may not have a corresponding collar or docking mechanism to mate with the docking system of the ROV. In one embodiment, the ROVs and subsea basket 101 each comprise acoustic modems that are configured to communicate with each other or the surface vessel via acoustic communications. The present disclosure is not limited to any particular node holding device or node transfer device or basket coupling device. In other words, the nodes may be transferred to and from the baskets and the ROVs (and/or from the baskets to the seabed) in any number of configurations. In other embodiments, an autonomous underwater vehicle (AUV) or other unmanned underwater vehicle (UUV) may be used instead of an ROV.

In one embodiment, each ROV and TMS is coupled with a beacon or transponder so that the surface vessel knows the position of each ROV and TMS. Likewise, subsea basket 101 may be equipped with a transponder or beacon such that its position may also be known. Because the surface vessel's position is known, the surface vessel knows at least the beginning position and the end position of each deployment line. For the purposes of this disclosure, the deployment line of an ROV may be considered (i) the tether portion from the ROV to the TMS, (ii) the umbilical portion from the TMS to the surface vessel, or (iii) the entire cable portion from the ROV to the surface vessel (which may itself be formed of multiple cables/lines, such as a tether portion and an umbilical cable portion). Various sensors, devices, inputs, etc. may be coupled to an Integrated Navigation System (INS) on the surface vessel or a Dynamic Positioning (DP) system for the ROV on the surface vessel or the ROV itself. In one embodiment, the length of the deployment line (whether from the TMS to the surface vessel or from the ROV to the TMS) is known. In one embodiment, the length of the tether line may be approximately 1200 meters, which increases the layback of the TMS and increases subsea separation of the ROVs. The surface vessel speed, heading, range, bearing may also be known. The current profile may also be known (whether based on measured profiles or estimates). The tension of each deployment line may be measured or predicted. In some embodiments, real time sensors utilized may include but not be limited to USBL beacon positions, vessel gyroscopes, ROV gyroscopes, Doppler velocity logs (DVL), current profilers, echo sounders, and motion reference units (MRUs). In still other embodiments, the pre-survey data and/or seabed profile may be inputted into the DP system, INS, and/or modeling software for a better predictive analysis of different subsea parameters, including a catenary shape of the deployment lines. In some embodiments, the disclosed system and method utilizes standalone time domain finite element (FE) software with a traditional INS to provide a navigation desk for the surface vessel and/or lowered equipment (e.g., ROV) with a real-time view of the catenary shape of the deployed lines based on input from one or more real time navigation sensors.

In one embodiment, some or all of the subsea ROV operations are handled automatically by the improved interaction of the ROV control system/DP system and the surface vessel INS. For example, the ROV may be automatically controlled by the surface vessel INS or ROV DP system during travel from a first subsea position to a second subsea position, docking with a subsea device, transfer of one or more payloads (e.g., seismic nodes) from a subsea device to the ROV, and placement of seismic payloads on the seabed. In other embodiments, some of the operations of the ROV may be automatically controlled by the DP system (such as horizontal movements of the ROV) while other operations of the ROV may be actively controlled by the ROV operator (such as depth control during near seabed conditions). In short, the present disclosure allows various subsea operations by the ROV to be automatically and remotely controlled by the surface vessel INS without the ROV operator directly hand steering the ROV.

In some embodiments, some or all of the ROV tasks (such as docking with a subsea device, loading/unloading subsea payloads, planting and picking up seismic nodes from the seabed, etc.) can be automated for increased efficiencies. The automation of such tasks is highly desirable, as it increases the efficiency of the particular and overall ROV operations and decreases operating costs. In particular, automation decreases manpower requirements, decreases the time needed for a particular event, increases repetition success rate, and increases the operational capabilities of particular tasks that require calculations of multiple factors. However, current ROV systems do not allow for a high degree of automation. For example, docking a ROV to a subsea device is typically performed manually, and flying an ROV from a first subsea position to a second subsea position is also performed manually by an ROV operator. The present disclosure allows different ROV tasks to be performed automatically. For example, the integrated surface vessel INS and ROV DP system allows for automation of ROV subsea flight movements without needing the ROV operator to physically steer the ROV.

Figure 2:
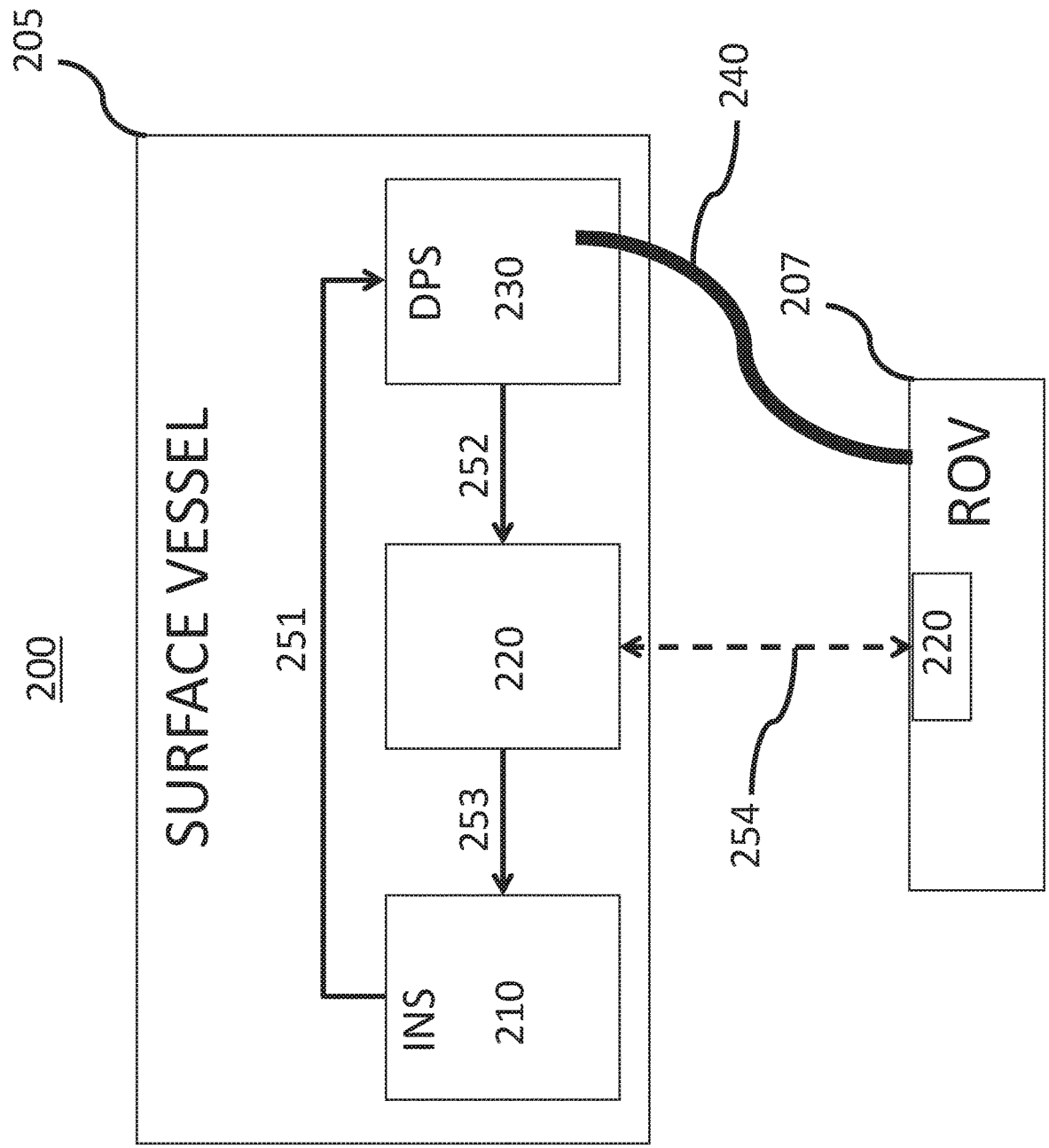
FIG. 2 illustrates a block diagram showing one embodiment of a surface vessel operating system coupled to an ROV dynamic positioning system.

FIG. 2 illustrates a block diagram showing one view of an external ROV control system 200 comprising a surface vessel coupled to an ROV. Although much of the description herein is related to a single INS and a single ROV (along with a single ROV DP system), the present disclosure is not limited as such and could equally apply to multiple INS (whether on a single surface vessel or multiple surface vessels) as well as multiple ROVs (along with corresponding DP systems) coupled to the same single vessel or different surface vessels.

As shown in FIG. 2, surface vessel 205 may comprise a seismic Integrated Navigation System (INS) 210, a ROV Dynamic Positioning (DP) System 230, and positioning system 220 configured to determine the position of ROV 207. Some or all of positioning system 220 may be located on ROV 207 and/or surface vessel 205. As shown in FIG. 2, in one embodiment ROV positioning system 220 is partially located on surface vessel 205 and partially located on ROV 207. Positioning system 220 may include various sensors, devices, cameras, acoustic modems, etc. that help determine the subsea position (x, y, z positions) of the ROV at all operational times and positions of the ROV. In one embodiment, a plurality of sensors of positioning system 220 measure the ROV's six degrees of freedom (such as roll, pitch, yaw, surge, sway, and heave) by way of at least one gyrocompass and one or more accelerometers on the ROV, which may be part of and/or integrated with an Inertial Navigation System on the ROV. Such sensors may also be coupled to the surface vessel INS that may use the sensor measurements to help determine ROV position. While one embodiment includes positional sensors on the surface vessel, in other embodiments all of the positional sensors are located on the ROV and the surface vessel INS uses the ROV positional sensors to better determine the ROV's position and six degrees of freedom. In one embodiment, the depth of the ROV is measured using a precision quartz pressure sensor, the altitude of the ROV may be determined using echo sounding techniques (when the ROV is close to the seabed), and the velocity of the ROV is measured using a Doppler Velocity Log (DVL). Position data 254 may be transmitted wirelessly (acoustically, electromagnetically, optically, etc.) from ROV 207 and surface vessel 205 or may be included over tether line 240. In one embodiment, the range and bearing from a known location (such as the surface vessel or a previously surveyed acoustic transponder using well known acoustic techniques such as Ultra Short Base Line (USBL) or Long Base Line (LBL)) is used to give a position relative to the known location and this may augment the INS position. In one embodiment ROV DP system 230 is coupled to ROV 207 by tether line 240 (along with associated Tether Management System (TMS) and other necessary wires/cables, not shown), which allows two-way communications between the ROV and surface vessel as is known in the art. DP system 230 allows the ROV to remain stationary at a subsea position, hold a preset course during subsea travel, maintain a set speed, etc., and DP system 230 also provides commands to ROV 207 such that DP system can automatically control the ROV during various subsea operations without an ROV operator physically steering or handling the ROV. Data may be exchanged between DP system 230 and positioning system 220 via path 252, and data may be exchanged between positioning system 220 and INS 210 via path 253. While the embodiment shown in FIG. 2 shows only one-way communication between systems 210, 220, and 230, two-way communications are also envisioned between the different systems. In one embodiment, INS 210 calculates the position of the ROV in real-time based on measurements from positioning system/sensors 220. In other embodiments, positioning system 220 is part of DP system 230 or INS 210.

As shown in FIG. 2, the present disclosure creates a data communications link between surface vessel INS 210 and ROV DP system 230. In one embodiment, INS 210 and DP system 230 are directly coupled via digital data link 251. In one embodiment, data link 251 comprises commercially available Ethernet hardware, network switches, and/or routers that use a standard TCP/IP protocol. INS 210 may send positional data of ROV 207 to DP system 230 as well as coordinates of the next target position of the ROV (whether it is a seabed destination or some other subsea destination) as selected by the INS operator or automatically by the INS. In one embodiment, the position data may include messages of a defined format of the coordinates in 2 dimensions (e.g., x, y) or 3 dimensions (e.g., x, y, z). In some embodiments, INS 210 may send frequent updates (e.g., one update per second) on the ROV's position to DP system 230. Such data/messages from INS 210 provides enough information to DP system 230 to make the necessary commands to the ROV propulsion system to proceed to the target position according to predefined parameters. As compared to the prior art, this routing of data, commands, and positions directly from the INS to the ROV DP system allow for automated control of the ROV without necessitating the ROV operator to physically steer the ROV from a first position to a second position.

As shown in FIG. 2, ROV 207 is shown as a simple blank box, realizing that the ROV can be any conventional working-class type remotely operated vehicle as is known in the art. Such an ROV may include the necessary propulsion system, control system, sensors, cameras, acoustic transponders/modems, etc., see e.g., U.S. Pat. No. 9,873,496, incorporated herein by reference. The ROV may also include a robotic arm for picking up and placing autonomous seismic nodes on the seabed and a skid, compartment, tray, arm, or other holding device that can hold one or more autonomous seismic nodes (or other payload devices) during subsea travel as is known in the art. The ROV may also include a docking system that can couple, mate, and/or dock with a separate subsea device, such as a subsea basket for the transfer of a plurality of autonomous seismic nodes to and from the ROV and the subsea device.

Figure 3:
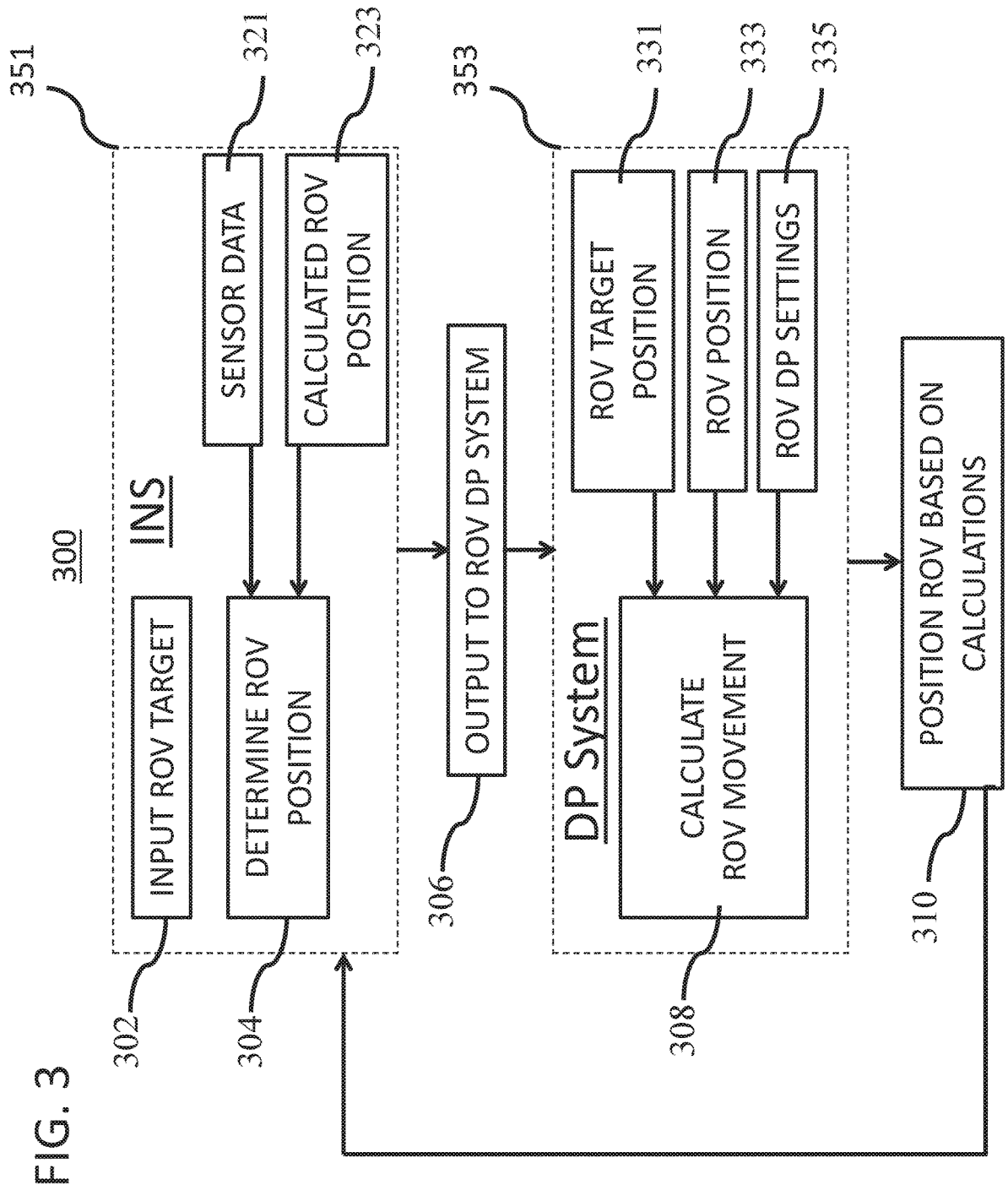
FIG. 3 illustrates one operational flowchart and/or method for the control of a ROV and/or a ROV's dynamic positioning system by an external navigation system.

FIG. 3 illustrates one operational flowchart and/or method 300 for the control of the ROV and/or ROV's DP system by an external navigation system. The system utilized by the operational flowchart/method described in FIG. 3 may be substantially similar to system 200 described in FIG. 2. As stated above, the present disclosure creates a direct coupling and/or data link between surface vessel INS 351 and ROV DP system/controller 353. In one embodiment, both INS 351 and ROV DP system 353 are located on the surface vessel. Step 302 comprises inputting a target for the ROV to travel towards. The target position may be automatically selected by the INS or may be inputted manually by an INS operator either by selecting a target with preset coordinates or by inputting particular x, y, z coordinates. In one embodiment, the ROV target position may be a preplot location or any fixed or dynamic waypoint defined by the INS, such as a particular seabed location (e.g., seismic node position), the position of another ROV, the ROV's Tether Management System (TMS), a winch hook, or a "basket" containing pallets of seafloor equipment lowered down from the vessel, etc. Step 304 comprises determining the ROV position in real time or near-real time. In one embodiment, determining the ROV position is based on ROV position sensor data 321 as well as the calculated ROV's current position 323. Thus, in some embodiments, step 304 comprises processing and/or decoding ROV position sensor data, which may be received from one or more sensors on the ROV or surface vessel or other locations. In one embodiment both steps 302 and 304 are performed by INS 351.

Step 306 comprises outputting the ROV target location and the ROV position to the ROV DP system 353. System 353 may be located on the surface vessel or on the ROV. The output may be simple two or three dimensional coordinates or more complicated instructions, and may be communicated to the DP system at regular time intervals such as every one second. The ROV target may be provided to the ROV DP system prior to outputting the ROV position or both the ROV target and ROV position may be provided simultaneously to the ROV DP system. In one embodiment, step 306 comprises receiving the ROV target position from the INS as well as frequent (e.g., approximately one per second) measurements of the real-time ROV position as calculated by the INS. In one embodiment, the ROV target position changes each time a seismic navigator/operator/pilot submits a new target to the INS.

Step 308 comprises calculating the necessary ROV movement and/or action to move the ROV from the current ROV position to the target ROV position. The calculated ROV movement could be a single action or a series of actions intended to move the ROV from a first subsea position to a second subsea position, which may or may not be the final target ROV position. In one embodiment, calculating the ROV actions/movement is based on the ROV target position 331, the latest ROV position 333, and one or more ROV DP settings 335. In one embodiment, the ROV DP settings may be determined by preset variables (by a computer or the operator) or may include separate real-time data inputs such as but not limited to the maximum ROV speed, current, surface vessel speed, interaction with other ROVs, catenary shape of the ROV tether/deployment line, surface vessel heading rate of change, and permission from the ROV pilot to use these various INS references to move the ROV. In other words, based on a large list of operating parameters the ROV DP system calculates the most effective move or series of moves for the ROV to take to move the ROV towards the intended ROV target position in the most efficient manner. In one embodiment, all of these steps are taken—and the ROV is moved towards the target position—without the ROV operator physically steering the ROV. Step 310 comprises outputting/transmitting the calculated moves to the ROV and/or positioning the ROV based on the calculations performed in step 308. As appropriate, the ROV propulsion system (such as thrusters and a buoyancy control system) may be actuated as necessary to move the ROV towards the ROV target position.

This entire process is continually repeated for a given ROV target position (e.g., the ROV position is determined and outputted to the DP system, the necessary actions are calculated and outputted to the ROV, the ROV moves according to the calculations, the ROV position is determined and outputted to the DP system, etc.) until the target position has been achieved or until a new target position has been defined. In some embodiments, multiple ROV target positions can be preselected/identified such that once the ROV reaches the first target position (and performs any necessary actions) it can automatically start moving towards the second, third, fourth, etc. target position. In some embodiments, some or all of the ROV tasks (such as docking with a subsea device, loading/unloading subsea payloads, planting and picking up autonomous seismic nodes from the seabed, etc.) can be automated for increased efficiencies and be performed automatically by the ROV once it hits the target ROV position. In other words, each ROV target position may be associated with a ROV operational task that can be performed automatically by the ROV. If multiple ROVs are used, the described flowchart/method could similarly be used, with different outputs from the INS going to separate ROV DP systems for each ROV. Each ROV could be connected to the same surface vessel or a different surface vessel such that communications would travel from the INS on a first surface vessel to a second vessel.

Figure 4:
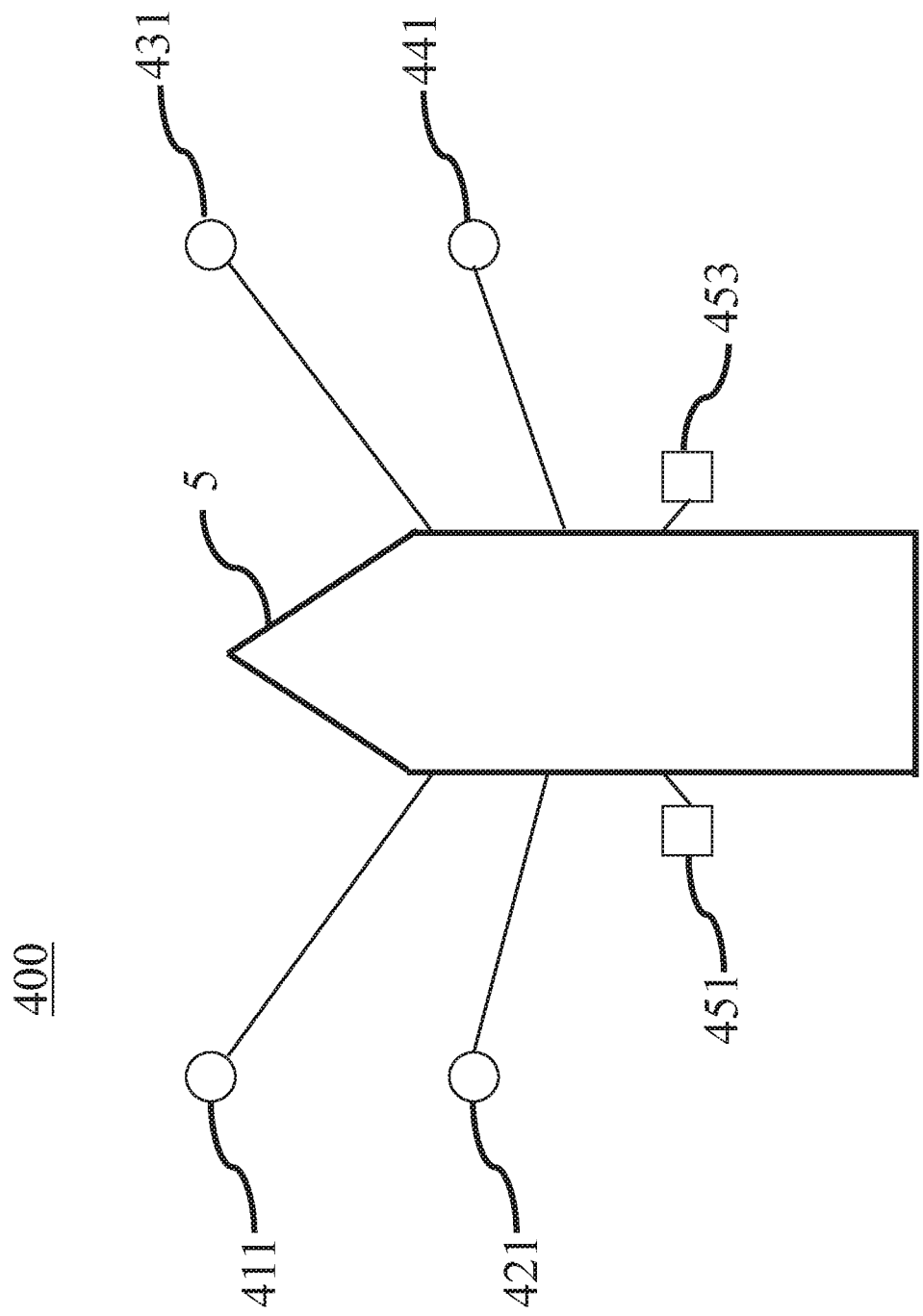
FIG. 4 shows one embodiment of an emergency situation configuration for a plurality of ROVs by an integrated INS/DP system.

FIG. 4 shows one example of an ROV configuration in an emergency setting protocol that may be implemented by the disclosed integrated INS/DP system. In the event of an emergency situation, it is desirable to move the ROVs to a predetermined location from each other, the baskets, the surface vessel, and/or the TMS units for safety issues, to avoid causing additional damage to one or more of the ROV systems, or to prevent any damage at all. An emergency situation may include but not be limited to the following: an ROV system failure, an ROV system becomes entangled with a subsea or seabed hazard (or other ROV), surface vessel slow down or change of course, an unplanned need to slow the surface vessel down to a partial or full stop due to a delay in the ROV operations and/or issue for the missions, and/or environmental (subsea or surface) condition changes that result in unsafe conditions for operations to continue.

As shown in FIG. 4, surface vessel 5 may deploy a plurality of ROVs into a body of water, such as first ROV 411, second ROV 421, third ROV 431, and fourth ROV 441. More or less ROVs are possible. Each ROV may be coupled to a tether management system (TMS) as is known in the art that is coupled to the surface vessel. The surface vessel may also deploy one or more subsea baskets, such as baskets 451 and 453. In one embodiment, a plurality of ROVs may be deployed from a first side of the vessel and a different plurality of ROVs may be deployed from another side of the vessel. Likewise, each subsea basket may be deployed from different sides of the vessel. The surface vessel may comprise the integrated INS system and the ROV DP system(s), as disclosed in the present application. In one embodiment, the INS may have default mission commands loaded that may command the DP system to move each of the plurality ROVs to a predetermined position in response to an emergency and/or safety situation. In other embodiments, the surface vessel speed and/or position may similarly be controlled in parallel as the movement of the ROVs. As shown in FIG. 4, system 400 shows an emergency hold position of the plurality of ROVs, in which each of the ROVs may be moved away from the surface vessel, the other ROVs, and the other TMS units to create separation from the other devices for safety concerns.

While there are various command scripts that can be contemplated, in one embodiment, the following command scripts represent an example that can be executed upon an emergency signal. First, the surface vessel speed can be reduced to approximately 0.0 knots. In some embodiments, the heading and/or direction of the vessel may be altered as appropriate. Second, a first plurality of ROVs (such as ROV 421 and ROV 441) is returned to within a predetermined distance (such as 100 meters) of their corresponding TMS at a particular heading (such as 120 degrees) and hold their position/station. This distance can be a predetermined position away from each of the other subsea devices (whether ROVs, baskets, TMS devices, subsea hazards, etc.) Third, the TMS units for ROVs 421 and 441 are hoisted to a certain depth and/or force (such as 100 kgf) to create separation between the other TMS devices and baskets 451, 453. Fourth, a second plurality of ROVs (such as ROVs 411 and 431) are returned to within a predetermined distance (such as 150 meters) of their corresponding TMS at a particular heading (such as 160 degrees) and hold their position/station. Fifth, the TMS units for ROVs 411 and 431 are hoisted to a certain depth and/or force (such as 150 kgf) to create separation between the other TMS devices and baskets 451, 453. Of course, in some embodiments, the TMS units are not moved, and only the ROVs are repositioned; and in other embodiments the TMS units may be moved without moving the ROVs. In one embodiment, the exact command script for the emergency situation would be loaded prior to start of operations and there may be several command script alternatives based on likely emergency scenarios.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the system are within the scope of the invention. For example, although much of the description herein is related to a single INS and a single ROV (along with a single ROV DP system), the present disclosure is not limited as such and could equally apply to multiple INS (whether on a single surface vessel or multiple surface vessels) as well as multiple ROVs (along with corresponding DP systems) coupled to the same single vessel or different surface vessels. As another example, a ROV DP system may be fully integrated with and/or part of a surface vessel INS. As another example, the INS can be integrated into the ROV DP system, which may allow the DP system to continually calculate the ROV position. In another embodiment, an INS and ROV DP system may be combined and associated for each ROV, which is particularly helpful for a large number of working ROVs, such that the surface vessel and associated systems may control the operations and operate as a "hive mind" for the plurality of ROVs.

Further, while one embodiment is directed to deployment of seabed seismic sensors, the remote control of the ROV DP system by an external INS is applicable to a wide variety of ROV subsea operations that are not limited to autonomous seismic nodes. For example, the present disclosure may be particularly useful when there are multiple ROVs with unequal capabilities, including but not limited to differing ROV power, thruster, payload weights, or fully/partially disabled. In such situations, the disclosed system may design the optimal ROV paths so that the overall operations of the system are the most effective and efficient, such as having the faster ROVs take longer routes than the slower ROVs. Still further, the ROV may be tethered or untethered, and in some embodiments any unmanned underwater vehicle (UUV) may be used instead of an ROV. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method for the remote control of a remotely operated vehicle, comprising
deploying a plurality of remotely operated vehicles (ROVs) from a surface vessel, wherein each of the plurality of ROVs is coupled to a dynamic positioning (DP) system;
deploying a plurality of seismic nodes on the seabed by the plurality of ROVs;
determining a subsea position of each of the plurality of ROVs by an Integrated Navigation System (INS) on the surface vessel and outputting that ROV position to the DP system, wherein the subsea position is determined in real-time;
automatically selecting a target seabed position for each of the plurality of seismic nodes by the INS;

automatically outputting the target seabed position for each of the plurality of seismic nodes to the DP system;

automatically outputting an ROV position and ROV target position from the INS to the DP system at a regular time interval;

automatically positioning each of the plurality of ROVs from a first target seabed position to a second target seabed position based on commands provided by the INS to the DP system based on the selected target seabed position and the ROV position;

automatically deploying each of the plurality of seismic nodes on the seabed at the selected target seabed position by the plurality of ROVs based on commands provided by the DP system; and automatically determining a flight path of the ROV between the selected target seabed positions after positioning each of the plurality of seismic nodes on the seabed and automatically positioning the ROV based on that flight path.

2. The method of claim 1, further comprising deploying a subsea basket configured to hold the plurality of seismic nodes from the surface vessel; and automatically transferring a portion of the plurality of seismic nodes from the subsea basket to the one or more ROVs based on commands from the DP system.

3. The method of claim 2, further comprising automatically docking the one or more ROVs to the subsea basket based on commands provided by the INS.

4. The method of claim 1, wherein the automatically positioning step does not require an ROV operator to physically steer the ROV.

5. The method of claim 1, wherein the INS is directly coupled to the ROV DP system.

6. The method of claim 1, wherein the INS and ROV DP system are both located on the surface vessel.

7. The method of claim 1, wherein the INS and ROV DP system are at least partially located on each of the one or more ROVs.

8. The method of claim 1, further comprising calculating one or more ROV movements by the DP system based on data received by the INS.

9. The method of claim 8, wherein the calculating step is based on the ROV target position, the ROV position, and one or predefined ROV operating parameters.

10. The method of claim 1, further comprising automatically positioning each of the one or more ROVs at a predefined position by the DP system based on an emergency situation.

* * * * *